(12) United States Patent
Ou

(10) Patent No.: US 8,661,190 B2
(45) Date of Patent: Feb. 25, 2014

(54) FLASH MEMORY DEVICE AND DATA ACCESS METHOD THEREOF

(75) Inventor: Hsu-Ping Ou, Zhubei (TW)

(73) Assignee: Silicon Motion, Inc., Jhubei (TW)

( * ) Notice: Subject to any disclaimer, the term of this patent is extended or adjusted under 35 U.S.C. 154(b) by 197 days.

(21) Appl. No.: 13/301,320

(22) Filed: Nov. 21, 2011

(65) Prior Publication Data

US 2012/0166710 A1 Jun. 28, 2012

(30) Foreign Application Priority Data

Dec. 22, 2010 (TW) .............................. 99145155 A

(51) Int. Cl.
G06F 12/02 (2006.01)
(52) U.S. Cl.
USPC .................... 711/103; 711/154; 711/E12.008
(58) Field of Classification Search
USPC ................................. 711/103, 154, E12.008
See application file for complete search history.

(56) References Cited

U.S. PATENT DOCUMENTS

| 2006/0064538 | A1* | 3/2006 | Aizawa | 711/103 |
| 2011/0029741 | A1* | 2/2011 | Kuo | 711/154 |
| 2011/0179216 | A1* | 7/2011 | Hsiao | 711/103 |

* cited by examiner

*Primary Examiner* — Yong Choe
(74) *Attorney, Agent, or Firm* — Wang Law Firm, Inc.; Li K. Wang; Stephen Hsu

(57) ABSTRACT

In one embodiment, the flash memory device is coupled to a host, and comprises a flash memory and a controller. The flash memory is used for data storage. The controller receives write data and a write logical address from the host, calculates a running sum value according to the write data, determines whether target data with a running sum equal to the running sum value is stored in the flash memory, reads the target data from the flash memory when the target data is stored in the flash memory, determines whether the target data is identical to the write data, and records a mapping relationship between an original logical address of the target data and a write logical address of the write data in a remapping table without writing the write data to the flash memory when the target data is identical to the write data.

15 Claims, 4 Drawing Sheets

| Remapping table | |
|---|---|
| Original logical address | New logical address |
| $LA_0$ | $LA_{00}$ |
| $LA_0$ | $LA_{01}$ |
| $LA_0$ | $LA_{02}$ |
| $LA_1$ | $LA_{10}$ |
| $LA_1$ | $LA_{11}$ |
| ... | ... |
| $LA_m$ | $LA_{m0}$ |
| $LA_m$ | $LA_{m1}$ |

FIG. 4

| Running sum recording table | |
|---|---|
| Running sum value | Logical address |
| $RS_0$ | $LA_0$ |
| $RS_1$ | $LA_1$ |
| $RS_2$ | $LA_2$ |
| ..... | ..... |
| $RS_n$ | $LA_n$ |

FIG. 3

FLASH MEMORY DEVICE AND DATA ACCESS METHOD THEREOF

CROSS REFERENCE TO RELATED APPLICATIONS

This Application claims priority to Taiwan Patent Application No. 99145155, filed on Dec. 22, 2010, the entirety of which is incorporated by reference herein.

BACKGROUND OF THE INVENTION

1. Field of the Invention

The invention relates to memories, and more particularly to flash memories.

2. Description of the Related Art

A conventional flash memory device stores data for a host and comprises a controller and a flash memory. The flash memory comprises a plurality of blocks for data storage, and the controller manages the data of the flash memory. When the host wants to write data to the flash memory, the host sends a write command to the flash memory device, and the controller then writes data to the flash memory according to the write command. When the host wants to read data from the flash memory, the host sends a read command to the flash memory device, and the controller then reads data from the flash memory according to the read command and then sends the read-out data back to the host.

When the host sends a write command to the flash memory device to order the flash memory device to write data thereto, the data amount processed by the flash memory is often greater than the data amount sent from the host. When an old block with the write address comprised by the write command has stored old data, the controller must remove the old data from the old block before the write data is written to the write address of the old block. When the old data cannot be removed from the old block, the controller must allocate a new block from the flash memory for the write data, and then the write data is stored to the new block instead of the old block. When the new block has no extra space to store new data, the controller must integrate the write data stored in the new block and the old data stored in the old block to obtain integrated data, and then the integrated data is written to a spare block. All aforementioned operations of data being removed and data being integrated increases the data processing load of the controller, extends the time period required by executing the write command, and degrades the performance of the flash memory device.

A criterion for measuring a performance level of a flash memory device is a write amplifier index (WAI). The write amplifier index is equal to a ratio of a data amount physically processed by a flash memory of the flash memory device to a data amount sent from a host to the flash memory device. When the host sends a write command to the flash memory device to order the flash memory device to write a small amount of the data from the flash memory, if the controller physically accesses a large amount of data from the flash memory, the controller processes the write command with low efficiency and poor performance, and the WAI value of the flash memory device is high. When the host sends a write command to the flash memory device to order the flash memory device to write a small amount of data from the flash memory, if the controller physically access a smaller amount of data from the flash memory, the controller processes the write command with high efficiency and good performance, and the WAI value of the flash memory device is low.

To improve the performance of a flash memory device, the WAI value of the flash memory device must be lowered. The invention therefore provides a data access method for a flash memory device to lower a value of a write amplifier index of the flash memory device, thereby improving the performance of the flash memory device.

BRIEF SUMMARY OF THE INVENTION

The invention provides a flash memory device. In one embodiment, the flash memory device is coupled to a host, and comprises a flash memory and a controller. The flash memory is used for data storage. The controller receives write data and a write logical address from the host, calculates a running sum value according to the write data, determines whether target data with a running sum equal to the running sum value is stored in the flash memory, reads the target data from the flash memory when the target data is stored in the flash memory, determines whether the target data is identical to the write data, and records a mapping relationship between an original logical address of the target data and a write logical address of the write data in a remapping table without writing the write data to the flash memory when the target data is identical to the write data.

The invention also provides a data access method for a flash memory device. In one embodiment, the flash memory device comprises a flash memory. First, write data and a write logical address is received from a host. A running sum value is then calculated according to the write data. Whether target data with a running sum equal to the running sum value is stored in the flash memory is then determined. When the target data is stored in the flash memory, the target data is read from the flash memory. Whether the target data is identical to the write data is then determined. When the target data is identical to the write data, a mapping relationship between an original logical address of the target data and a write logical address of the write data is then recorded in a remapping table without writing the write data to the flash memory.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 3 shows an embodiment of a running sum recording table according to the invention;

FIG. 4 shows an embodiment of a remapping table according to the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
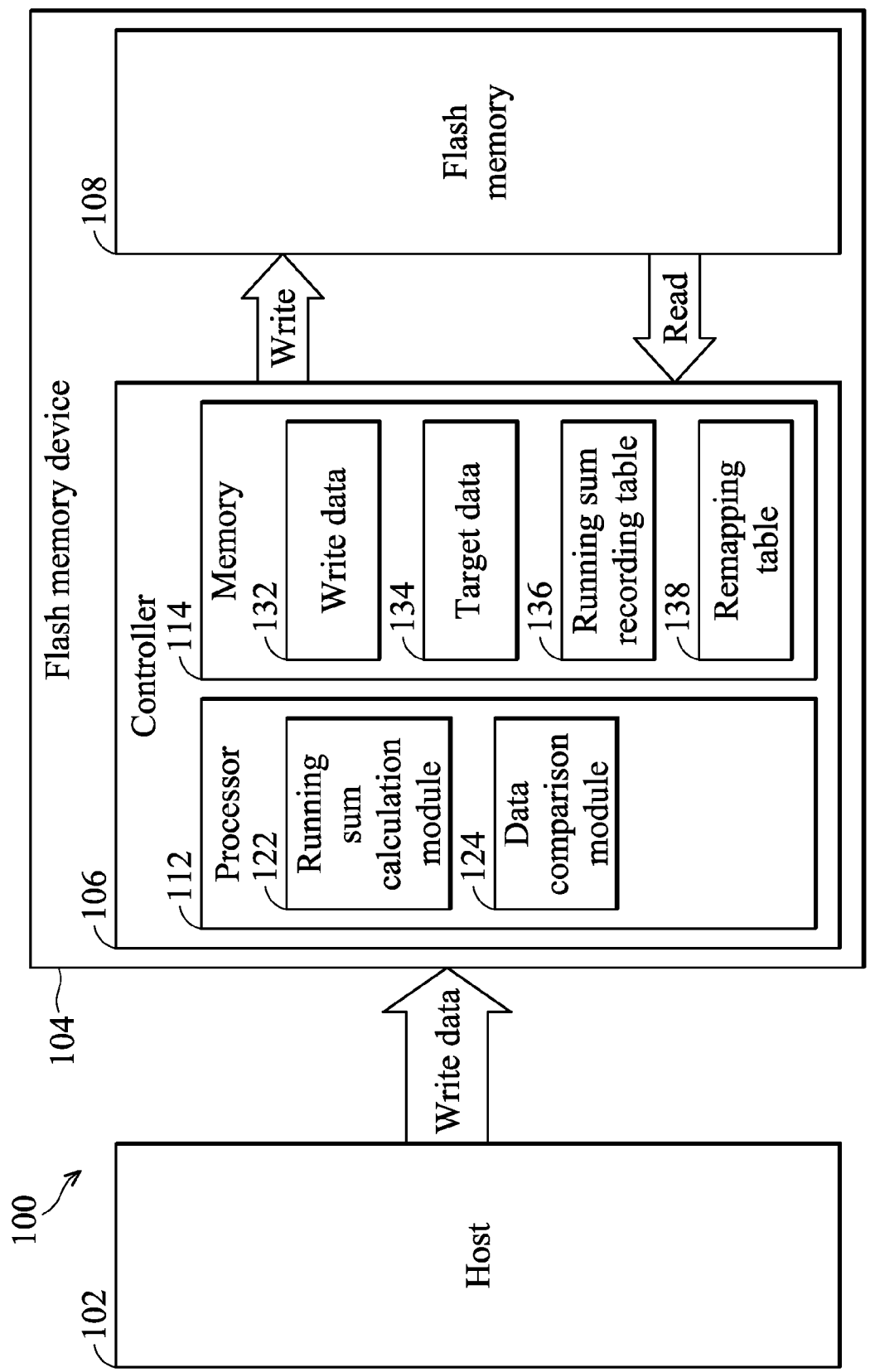
FIG. 1 is a block diagram of a data storage system according to the invention.

Referring to FIG. 1, a block diagram of a data storage system 100 according to the invention is shown. The data storage system 100 comprises a host 102 and a flash memory device 104. In one embodiment, the flash memory device 104 comprises a controller 106 and a flash memory 108. The flash memory 108 is used for data storage. The controller 106 writes data to the flash memory 108 according to write commands sent from the host 102, and reads data from the flash memory 108 according to the read commands sent from the host 102. In one embodiment, the controller 106 comprises a processor 112 and a memory 114. The processor 112 comprises a running sum calculation module 122 and a data comparison module 124. The memory 114 stores a running sum recording table 136 and a remapping table 138 therein. The running sum recording table 136 records a mapping relationship between running sum values of data stored in the flash memory 114 and logical addresses of the data stored in the flash memory 114, as shown in FIG. 3. The remapping table 138 records a plurality of logical addresses storing data with the same running sum values, as shown in FIG. 4.

Figure 2:
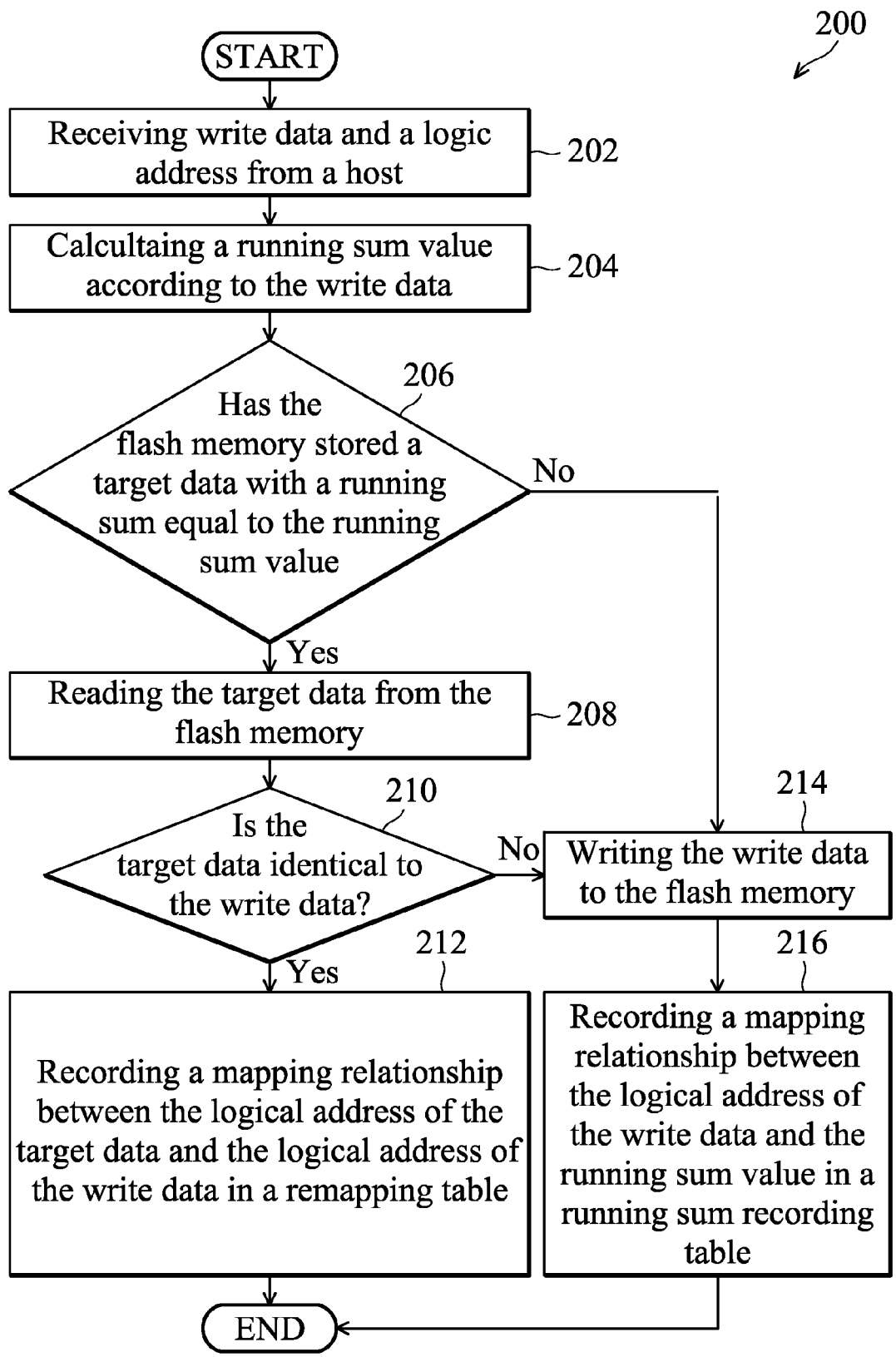
FIG. 2 is a flowchart of a data writing method for a flash memory device according to the invention.

Referring to FIG. 2, a flowchart of a data writing method 200 for a flash memory device 104 according to the invention is shown. When the controller 106 receives a write command, write data, and a logical address from the host 102 (step 202), the controller 106 first stores the write data 132 in the memory 114. The running sum calculation module 122 of the processor 112 then calculates a running sum value according to the write data (step 204). In one embodiment, the running sum value is a cyclic redundancy check (CRC) of the write data. The controller 106 then determines whether the target data which the flash memory 108 wants to store has a running sum equal to the running sum value of the write data (step 206). In one embodiment, the processor 112 looks up the running sum recording table 136 to determine whether the target data is stored in the flash memory 108. If a mapping relationship of the running sum value is recorded in the running sum recording table 136, the processor 112 determines that the target data is stored in the flash memory 108.

If the target data is not stored in the flash memory 108 (step 206), the controller 106 writes the write data 132 to the flash memory 108 (step 214), and records a mapping relationship between the running sum value of the write data and the logical address storing the write data in the running sum recording table 136 (step 216). Otherwise, if the target data is stored in the flash memory 108 (step 206), the controller 106 reads the target data from the flash memory 108 (step 208) and stores the target data in the memory 114. In one embodiment, the processor 112 looks up the running sum recording table 136 to find a target logical address corresponding to the running sum value of the write data, converts the target logical address to a target physical address, and reads the target data 134 from the flash memory 108 according to the target physical address.

The data comparison module 124 of the controller 106 then compares the write data 132 with the target data 134 to determine whether the write data 132 is identical to the target data 134 (step 210). If the write data 132 is identical to the target data 134, the controller 106 does not write the write data to the flash memory 108, and the controller 106 only records a mapping relationship between the original logical address of the target data and the logical address of the write data in the remapping table 138 (step 212). Thus, when the controller 106 executes the write command, the controller 106 omits the operation of physically writing the write data to the flash memory 108. The data amount physically written to the flash memory is therefore greatly reduced, and the write amplifier index (WAI) value of the flash memory device 104 is therefore also greatly reduced. The delay time period for executing the write command is therefore shortened, and the performance of the flash memory device 104 is therefore improved. If the write data 132 is not identical to the target data 134 (step 210), the controller 106 writes the write data 132 to the flash memory 108 (step 214), and records a mapping relationship between the running sum value of the write data and the logical address storing the write data in the running sum recording table 136 (step 216).

For example, assume that the controller 106 receives a first write command from the host 102, wherein the first write command orders the controller 106 to write first write data $D_0$ to a first logical address $LA_{00}$ of the flash memory 108. The processor 112 therefore first calculates a first running sum value $RS_0$ of the first write data $D_0$, and determines whether the running sum recording table 136 comprises a mapping relationship of the first running sum value $RS_0$. Because the running sum recording table 136 comprises a mapping relationship of the first running sum value $RS_0$, the flash memory 108 stores first target data $D_0'$ with a running sum equal to the first running sum value $RS_0$. The controller 106 therefore reads the first target data $D_0'$ from the flash memory 108 for comparison with the first write data $D_0$. If the first write data $D_0$ is identical to the first target data $D_0'$, the controller 106 does not write the first write data $D_0$ to the flash memory 108. The controller 106 records a mapping relationship between the logical address $LA_0$ of the first target data $D_0'$ and the logical address $LA_{00}$ of the first write data $D_0$ in the remapping table 400 shown in FIG. 4, thereby reducing the data amount written to the flash memory 108. The delay period induced by executing the first write command is therefore shortened, and the performance of the flash memory device 104 is therefore improved.

Assume that the controller 106 receives a second write command from the host 102, wherein the second write command orders the controller 106 to write second write data $D_1$ to a second logical address $LA_{10}$ of the flash memory 108. The processor 112 therefore first calculates a second running sum value $RS_1$ of the second write data $D_1$, and determines whether the running sum recording table 136 comprises a mapping relationship of the second running sum value $RS_1$. Because the running sum recording table 136 comprises a mapping relationship of the second running sum value $RS_1$, the second target data $D_1'$ with a running sum equal to the second running sum value $RS_1$ is stored in the flash memory 108. The controller 106 therefore reads the second target data $D_1'$ from the flash memory 108 for comparison with the second write data $D_1$. If the second write data $D_1$ is identical to the second target data $D_1'$, the controller 106 does not write the second write data $D_1$ to the flash memory 108. The controller 106 records a mapping relationship between the logical address $LA_1$ of the second target data $D_1'$ and the logical address $LA_{10}$ of the second write data $D_1$ in the remapping table 400 shown in FIG. 4, thereby reducing the data amount written to the flash memory 108. The delay period induced by executing the second write command is therefore shortened, and the performance of the flash memory device 104 is therefore improved.

Figure 5:
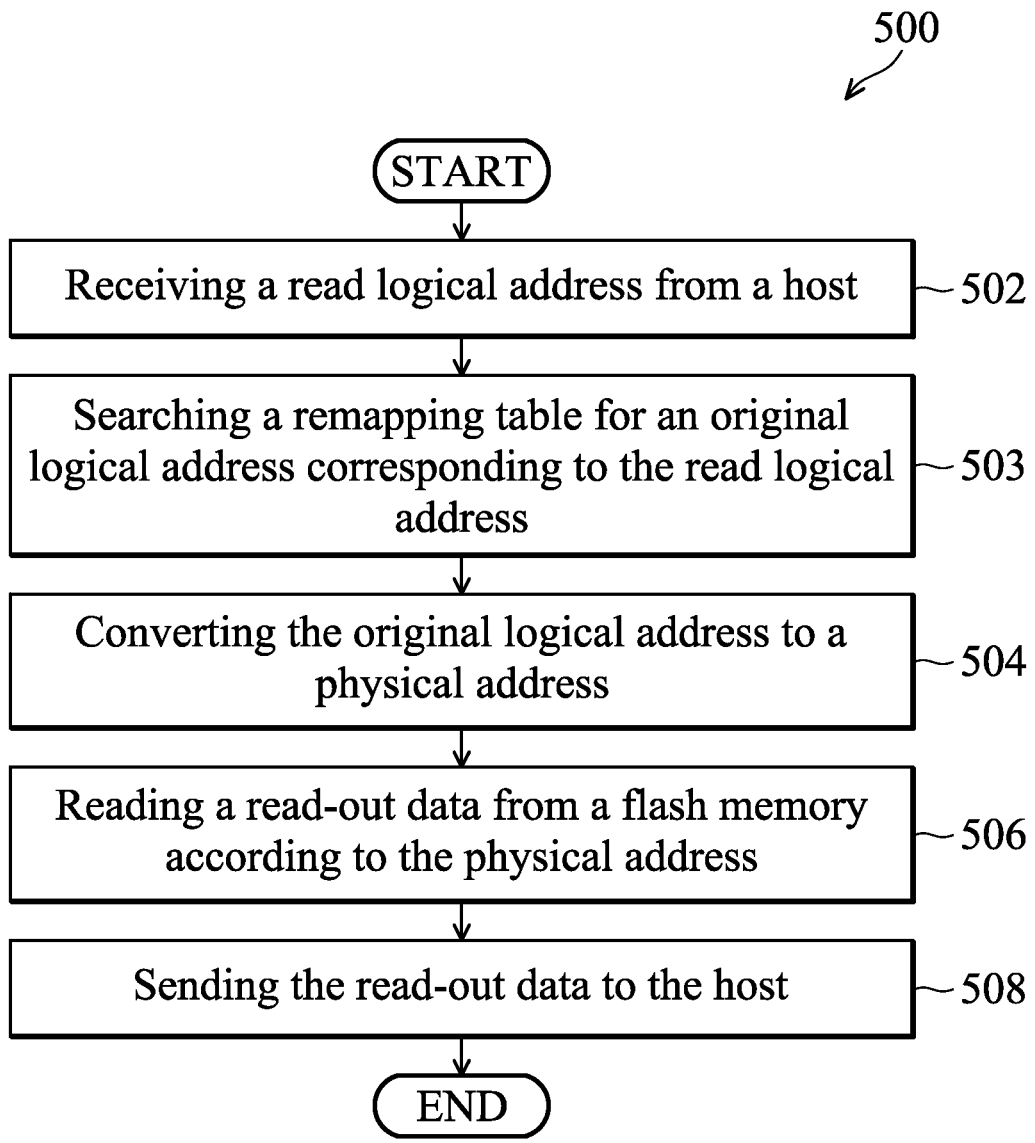
FIG. 5 is a flowchart of a data read method of a flash memory device according to the invention.

Referring to FIG. 5, a flowchart of a data read method 500 of a flash memory device 104 according to the invention is shown. First, the flash memory device 500 receives a read logical address from the host 102 (step 502). The controller 106 then looks up the remapping table 138 to find an original logical address corresponding to the read logical address (step 503). For example, as shown in the remapping table 400 of FIG. 4, if the read logical address is $LA_0$, $LA_{00}$, $LA_{01}$, or $LA_{02}$, the original logical address corresponding to the read logical address is $LA_0$. If the read logical address is $LA_1$, $LA_{10}$, or $LA_{11}$, the original logical address corresponding to the read logical address is $LA_1$. The controller 106 then converts the original logical address to a physical address (step 504), and reads a read-out data from the physical address of the flash memory 108 (step 506). For example, the original logical address $LA_0$ corresponding to the read logical addresses $LA_0$, $LA_{00}$, $LA_{01}$, and $LA_{02}$ is converted to a physical address, and the read-out data corresponding to the read logical addresses $LA_{00}$, $LA_{01}$, and $LA_{02}$ is therefore the same as the read-out data corresponding to the logical address $LA_0$. Finally, the controller 106 sends the read-out data to the host 102 (step 508).

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data access method for a flash memory device, wherein the flash memory device comprises a flash memory, comprising:
   receiving write data and a write logical address from a host;
   calculating a running sum value according to the write data;
   determining whether target data with a running sum equal to the running sum value is stored in the flash memory;
   when the target data is stored in the flash memory, reading the target data from the flash memory;
   determining whether the target data is identical to the write data; and
   when the target data is identical to the write data, recording a mapping relationship between an original logical address of the target data and the write logical address of the write data in a remapping table without writing the write data to the flash memory.

2. The data access method as claimed in claim 1, wherein the data access method further comprises:
   when the target data is not stored in the flash memory, writing the write data to the flash memory; and
   after the write data is written to the flash memory, recording a mapping relationship between the running sum value and the write logical address of the write data in a running sum recording table.

3. The data access method as claimed in claim 2, wherein determination of whether the target data is stored in the flash memory further comprises:
   looking up the running sum recording table according to the running sum value of the write data; and
   when a mapping relationship corresponding to the running sum value of the write data is recorded in the running sum recording table, determining that the target data is stored in the flash memory.

4. The data access method as claimed in claim 2, wherein reading of the target data further comprises:
   determining a target logical address corresponding to the running sum value according to the running sum value recording table;
   converting the target logical address to a target physical address; and
   reading the target data from the flash memory according to the target physical address.

5. The data access method as claimed in claim 1, wherein the data access method further comprises:
   when the target data is not identical to the write data, writing the write data to the flash memory; and
   after the write data is written to the flash memory, recording a mapping relationship between the running sum value and the write logical address of the write data in a running sum recording table.

6. The data access method as claimed in claim 1, wherein the running sum value is a cyclic redundancy check (CRC) of the write data.

7. The data access method as claimed in claim 1, wherein the data access method further comprises:
   receiving a read logical address from the host;
   searching the remapping table for an original read logical address corresponding to the read logical address;
   converting the original read logical address to a read physical address;
   reading read-out data from the flash memory according to the read physical address; and
   sending the read-out data to the host.

8. A flash memory device, coupled to a host, comprising:
   a flash memory, for data storage; and
   a controller, receiving write data and a write logical address from the host, calculating a running sum value according to the write data, determining whether target data with a running sum equal to the running sum value is stored in the flash memory, reading the target data from the flash memory when the target data is stored in the flash memory, determining whether the target data is identical to the write data, and recording a mapping relationship between an original logical address of the target data and the write logical address of the write data in a remapping table without writing the write data to the flash memory when the target data is identical to the write data.

9. The flash memory device as claimed in claim 8, wherein the flash memory device further comprises:
   a memory, storing the write data, the target data, and the remapping table; and
   a processor, comprising:
   a running sum calculation module, calculating the running sum value according to the write data; and
   a data comparison module, comparing the write data with the target data to determine whether the write data is identical to the target data.

10. The flash memory device as claimed in claim 8, wherein when the target data is not stored in the flash memory, the controller writes the write data to the flash memory, and records a mapping relationship between the running sum value and the write logical address of the write data in a running sum recording table.

11. The flash memory device as claimed in claim 10, wherein when the controller determines whether the target data is stored in the flash memory, the controller looks up the running sum recording table according to the running sum value of the write data, and determines that the target data is stored in the flash memory if a mapping relationship corresponding to the running sum value of the write data is recorded in the running sum recording table.

12. The flash memory device as claimed in claim 10, wherein the controller determines a target logical address corresponding to the running sum value according to the running sum value recording table, converts the target logical address to a target physical address, and then reads the target data from the flash memory according to the target physical address.

13. The flash memory device as claimed in claim 8, wherein when the target data is not identical to the write data, the controller writes the write data to the flash memory, and records a mapping relationship between the running sum value and the write logical address of the write data in a running sum recording table.

14. The flash memory device as claimed in claim 8, wherein the running sum value is a cyclic redundancy check (CRC) of the write data.

15. The flash memory device as claimed in claim 8, wherein the controller receives a read logical address from the host, searches the remapping table for an original read logical address corresponding to the read logical address, converts the original read logical address to a read physical address, reads read-out data from the flash memory according to the read physical address, and sends the read-out data to the host.

* * * * *